(12) United States Patent
Uyeki

(10) Patent No.: US 11,379,917 B2
(45) Date of Patent: Jul. 5, 2022

(54) SERVER FOR CREDIT MANAGEMENT

(71) Applicant: Honda Motor Co., Ltd., Tokyo (JP)

(72) Inventor: Robert Uyeki, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 30 days.

(21) Appl. No.: 16/992,433

(22) Filed: Aug. 13, 2020

(65) Prior Publication Data

US 2022/0051319 A1 Feb. 17, 2022

(51) Int. Cl.

| | | |
|---|---|---|
| G06Q 30/02 | (2012.01) | |
| G06Q 40/04 | (2012.01) | |
| G06Q 50/06 | (2012.01) | |
| G06Q 30/00 | (2012.01) | |
| G06Q 20/02 | (2012.01) | |

(52) U.S. Cl.
CPC ............. *G06Q 40/04* (2013.01); *G06Q 20/02* (2013.01); *G06Q 30/018* (2013.01); *G06Q 50/06* (2013.01)

(58) Field of Classification Search
CPC ...................................................... G06Q 30/02
See application file for complete search history.

(56) References Cited

U.S. PATENT DOCUMENTS

| | | | |
|---|---|---|---|
| 7,343,341 B2 | 3/2008 | Sandor et al. | |
| 10,135,253 B2 | 11/2018 | Lof et al. | |
| 10,438,281 B2 * | 10/2019 | Walsh | G06Q 40/02 |
| 2004/0039684 A1 | 2/2004 | Sandor | |
| 2008/0275746 A1 | 11/2008 | Musier et al. | |
| 2009/0043653 A1 | 2/2009 | Sandor et al. | |
| 2010/0057582 A1 | 3/2010 | Arfin et al. | |

(Continued)

FOREIGN PATENT DOCUMENTS

| | | | | |
|---|---|---|---|---|
| IN | 202141033631 A | * | 8/2021 | ............. B60L 53/14 |
| KR | 2017-0077552 A | * | 7/2017 | ............. G06Q 50/30 |

(Continued)

OTHER PUBLICATIONS

Zhigang zhao; Bin Zhao; Yong Xia, Research on Power Grid after Electric Vehicles Connected to Power Grid (English), 2015 8th International Conference on Grid and Distributed Computing (GDC) (pp. 36-39, Nov. 1, 2015 (Year: 2017).*

(Continued)

*Primary Examiner* — Marilyn G Macasiano
(74) *Attorney, Agent, or Firm* — Aaron Fong; American Honda Motor Co., Inc.

(57) ABSTRACT

A server and a method for credit management is provided. The server stores registration information for a plurality of electric charging facility devices. The server further receives electric charging information recorded for a period of time, from each of the plurality of electric charging facility devices. The server further transmits the electric charging information received from each of the plurality of electric charging facility devices to an electronic device associated with an energy regulatory authority. The server further receives first credit information associated with each of the plurality of electric charging facility devices from the electronic device. The first credit information is calculated based on the electric charging information. The server further transmits the received first credit information to each of the plurality of electric charging facility devices.

20 Claims, 6 Drawing Sheets

(56) References Cited

U.S. PATENT DOCUMENTS

| | | | |
|---|---|---|---|
| 2010/0235209 A1* | 9/2010 | Vaswani | G06Q 30/04 |
| | | | 705/308 |
| 2011/0137812 A1 | 6/2011 | Sherga | |
| 2012/0143787 A1 | 6/2012 | Needham | |
| 2016/0236585 A1* | 8/2016 | Miftakhov | B60L 58/12 |
| 2018/0232811 A1* | 8/2018 | Palanchian | G06Q 40/06 |
| 2018/0290546 A1* | 10/2018 | McGrath | B60L 53/53 |
| 2019/0130451 A1* | 5/2019 | Logvinov | G06Q 30/0272 |
| 2020/0160461 A1* | 5/2020 | Kaniki | H02J 7/342 |
| 2021/0021131 A1* | 1/2021 | Hanayama | H02J 3/14 |

FOREIGN PATENT DOCUMENTS

| | | | |
|---|---|---|---|
| WO | 200569870 A2 | 8/2005 | |
| WO | 201102710 A1 | 1/2011 | |
| WO | WO 2021/000015 A1 * | 1/2021 | G06Q 20/18 |

OTHER PUBLICATIONS

Asensio, Omar Isaac; Lawson, M. Cade; Apablaza, Camila Z., Electric Vehicle charging stations in the workplace with high-resolution data from casual and habitual users, Scientific Data, 8, 168, Jul. 7, 2021 (Year: 2021).*

Sara Mehar; Sidi Mohammed Senouci, An Optimization location scheme for electric charging stations (English), 2013/International Conference on Smart Communications in Network Technologies (SaCoNet) (vol. 01, pp. 1-5), Nov. 22, 2013 (Year: 2013).*

\* cited by examiner

SERVER FOR CREDIT MANAGEMENT

BACKGROUND

Generally, carbon generation authorities (such as Oil Industries) release carbon emissions as a byproduct of their production activity (such as oil production). Such carbon emissions (such as carbon dioxide or other greenhouse gases) may be released in an environment and creates pollution. To balance a pollution level in the environment, the carbon generation authorities may be required to collect carbon credits from other authorities (such as renewable energy industries), to offset and nullify their release of the carbon emissions in environment. Such collection of the carbon credits may provide a legal permit to the carbon generation authorities to emit a certain amount of the carbon emissions. However, as the carbon generation authorities are involved in a business that may be different from a business of the other authorities who may have the carbon credits, there may be a transaction gap or a collaboration gap between the carbon generation authorities and the other authorities. Therefore, there may be a need for a system that may facilitate coordination between multiple parties to effectively manage the carbon credits.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, a server for credit management is provided. The server may include a memory which stories registration information for a plurality of electric charging facility devices. The server may further include circuitry which may be coupled with the memory and may receive electric charging information recorded for a period of time, from each of the plurality of electric charging facility devices. The circuitry may further transmit the electric charging information received from each of the plurality of electric charging facility devices to an electronic device associated with an energy regulatory authority. The circuitry may further receive first credit information associated with each of the plurality of electric charging facility devices from the electronic device. The first credit information may be calculated based on the electric charging information. The circuitry may further transmit the received first credit information to each of the plurality of electric charging facility devices.

According to another embodiment of the disclosure, a method for credit management is provided. The method may include storing registration information for a plurality of electric charging facility devices. The method may further include receiving electric charging information recorded for a period of time, from each of the plurality of electric charging facility devices. The method may further include transmitting the electric charging information received from each of the plurality of electric charging facility devices to an electronic device associated with an energy regulatory authority. The method may further include receiving first credit information associated with each of the plurality of electric charging facility devices from the electronic device. The first credit information may be calculated based on the electric charging information. The method may further include transmitting the received first credit information to each of the plurality of electric charging facility devices.

According to an embodiment of the disclosure, a system is provided. The system may include a plurality of electric charging facility devices. The system may further include a server that may be communicably coupled and registered with the plurality of electric charging facility devices. The server may receive electric charging information recorded for a period of time, from each of the plurality of electric charging facility devices. The server may further transmit the electric charging information received from each of the plurality of electric charging facility devices to an electronic device associated with an energy regulatory authority. The server may further receive first credit information associated with each of the plurality of electric charging facility devices from the electronic device. The first credit information may be calculated based on the electric charging information. The server may further transmit the received first credit information to each of the plurality of electric charging facility devices.

Figure 1:
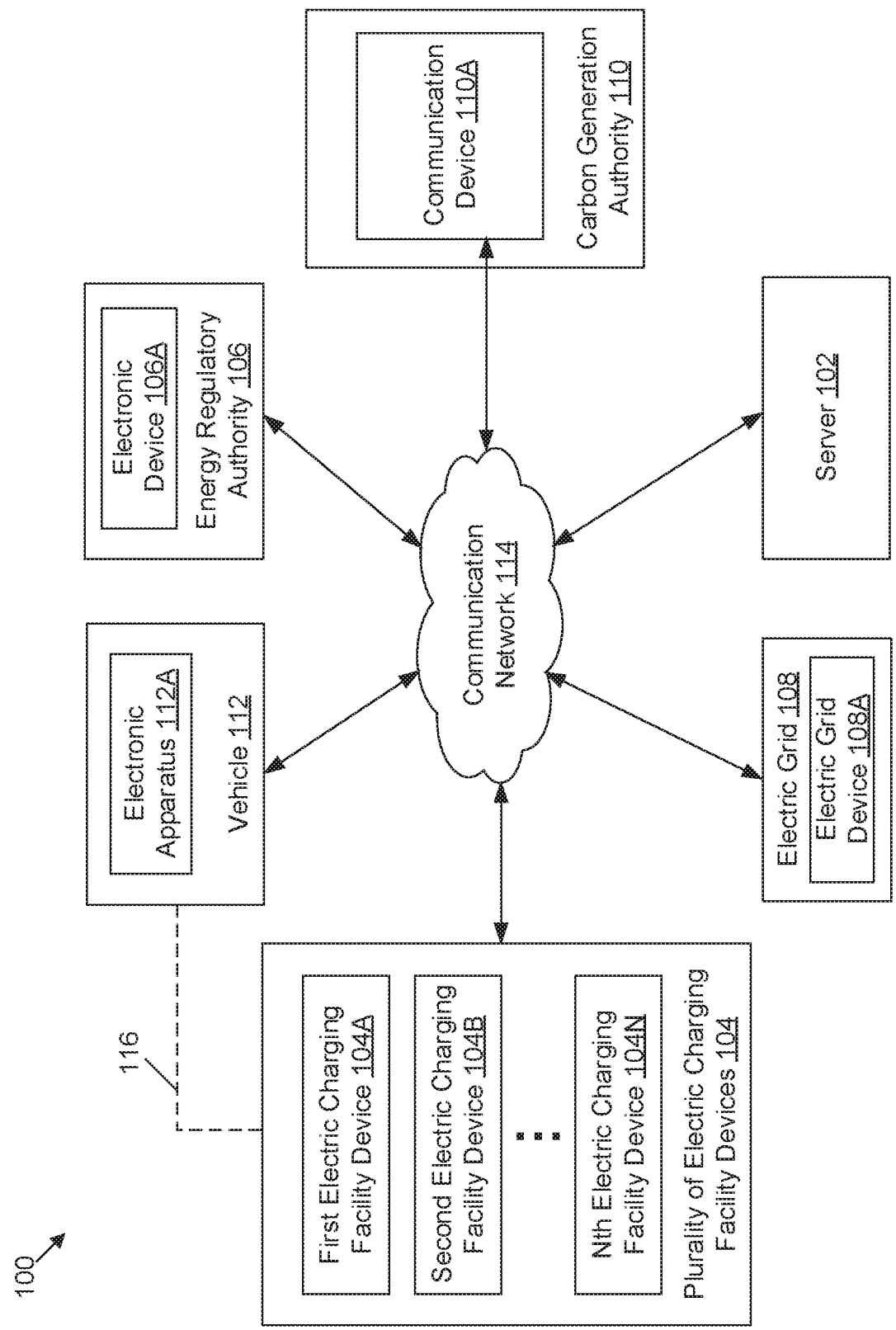
FIG. 1 is a block diagram that illustrates an exemplary network environment for credit management by a server, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed server for credit management. Exemplary aspects of the disclosure may provide a server (such as an aggregator) that may be configured to store registration information (identification information, location, etc.) related to a plurality of electric charging facility devices (such as an electric vehicle charging equipment, a public electric charging station, a home electric charging facility, etc.). The server may receive electric charging information (such as vehicle charging data, a renewable energy certificate, etc.) from each of the plurality of electric charging facility devices. The server may further transmit the received electric charging information to an electronic device associated with an energy regulatory authority (such as a carbon regulator board). The server may further receive first credit information (such as a carbon credit) from the electronic device, based on the transmitted electric charging information. The server may further transmit the received first credit information to each of the plurality of electric charging facility devices. Each of the plurality of electric charging facility devices may then utilize such received first credit information for monetization purposes. As an additional purpose, the plurality of electric charging facility devices may even utilize the received first credit information to offset their own carbon emission or footprint.

The server may further receive a request (such as a carbon credit offset request) from a carbon generation authority (such as, but not limited to, an oil industry). The server may further transmit the received request to each of the plurality of electric charging facility devices. The server may further receive second credit information (such as an offset carbon credit) from one of the plurality of electric charging facility devices. The server may further transmit the received second credit information to the carbon generation authority and further receive monetary information (such as digital money, monetary points, or redeemable points) from the carbon generation authority based on the transmitted second credit information. The server may further transmit the received monetary information to the one of the plurality of electric charging facility devices, which may have provided the second credit information.

Therefore, the disclosed server may effectively collaborate between each of the plurality of electric charging facility devices, the energy regulatory authority, and the carbon generation authority to manage credit information (i.e. carbon credits). Based on the collaboration provided by the disclosed server, it may facilitate the plurality of electric charging facility devices to collect the carbon credits from the energy regulatory authority based on the provided electric charging information, and further facilitate the carbon generation authority to transact with the plurality of electric charging facility devices to collect the carbon credits for offsetting purposes. Therefore, the server may effectively manage the carbon credits between multiple parties.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a block diagram that illustrates an exemplary network environment for credit management by a server, in accordance with an embodiment of the disclosure. There is shown a network environment 100 which may include a server 102. The server 102 may be communicatively coupled with a plurality of electric charging facility devices 104, an energy regulatory authority 106, an electric grid device 108A associated with an electric grid 108, a carbon generation authority 110, and a vehicle 112, through a communication network 114. The vehicle 112 may include an electronic apparatus 112A. The plurality of electric charging facility devices 104 may include a first electric charging facility device 104A, a second electric charging facility device 104B, and a Nth electric charging facility device 104N for charging the vehicle 112. The energy regulatory authority 106 may include an electronic device 106A that may be configured to monitor a charging activity (such as charging the vehicle 112) of the plurality of electric charging facility devices 104 and issue a credit (such as carbon credit) based on the charging activity. The carbon generation authority 110 may include a communication device 110A that may be configured to purchase the issued credit. Modifications, additions, or omissions may be made to FIG. 1 without departing from the scope of the present disclosure. For example, the network environment 100 may include more or fewer elements than those illustrated and described in the present disclosure. For instance, in some embodiments, the network environment 100 may not include the electric grid 108, without deviation from the scope of the disclosure.

The server 102 may include suitable logic, circuitry, interfaces, and/or code that may be configured store registration information associated with the plurality of electric charging facility devices 104. The server 102 may further configured to handle a collaboration between the plurality of electric charging facility devices 104, the energy regulatory authority 106, the electric grid device 108A associated with the electric grid 108, the carbon generation authority 110, and the vehicle 112, for the credit management. The credit management may primarily include, but is not limited to, carbon credit information (such as a carbon credit) management, and monetary credit information management. In the carbon credit information management, the server 102 may be configured to collaborate between the plurality of electric charging facility devices 104 and the energy regulatory authority 106. In the monetary credit information management, the server 102 may be configured to collaborate between the plurality of electric charging facility devices 104 and the carbon generation authority 110. Details of such collaboration are further described, for example in FIGS. 3A-3C. In some embodiments, the server 102 may be implemented as a cloud server, which may be utilized to execute various operations through web applications, cloud applications, HTTP requests, repository operations, file transfer, and the like. Examples of the server 102 may include, but are not limited to, an event server, a database server, a file server, a web server, a media server, a content server, an application server, a mainframe server, or a combination thereof. In one or more embodiments, the server 102 may be implemented as a plurality of distributed cloud-based resources. In some embodiments, the server 102 may be a handheld or a portable device. In such case, the examples of the server 102 may include, but are not limited to, a computing device, a mainframe machine, a computer work-station, a smartphone, a cellular phone, a mobile phone, and/or any electronic device with data processing and networking capabilities.

The plurality of electric charging facility devices 104 may include suitable logic, circuitry, interfaces and/or code that may be configured to transfer electric energy between the vehicle 112 and the electric grid device 108A associated with the electric grid 108. The plurality of electric charging facility devices 104 may include the first electric charging facility device 104A, the second electric charging facility device 104B, and the Nth electric charging facility device 104N. The number of electric charging facility devices shown in FIG. 1 is presented merely as an example. The plurality of electric charging facility devices 104 may include even only one electric charging facility device or more than one electric charging facility devices to transfer electric energy between the vehicle 112 and the electric grid device 108A associated with the electric grid 108, without deviation from the scope of the disclosure. The plurality of electric charging facility devices 104 may be configured to control, process, and monitor the electric energy transferred between each of the vehicle 112 and the electric grid device 108A associated with the electric grid 108. In some embodiments, the plurality of electric charging facility devices 104 may store the electric energy received either from the electric grid device 108A associated with the electric grid 108 or from the vehicle 112, and further transfer the electrical charge to the vehicle 112 or to the electric grid 108, respectively. One of the plurality of electric charging facility devices 104 may transfer the electric energy to the vehicle 112, via an electrical transmission line 116 (i.e. charging cable, a wireless charging link, or the like). Examples of the plurality of electric charging facility devices 104 may include, but are not limited to an electric vehicle (EV) charging station, an electric recharging point, an electronic charging station, an electric vehicle supply equipment (EVSE), a Direct Current (DC) fast charging station, a home electric charging station, a domestic electrical socket, a level 1 charging station, a level 2 charging station, or a level 3 charging station.

The energy regulatory authority 106 may include suitable logic, circuitry, interfaces and/or code that may be configured to reduce carbon footprints by issuing a tradable certificate (such as the carbon credit information) to a charging entity (such as the plurality of electric charging facility devices 104) which performs or support sustainable development activities. The sustainable development activities may include, but not limited to, usage of renewable energy sources (such as wind, solar, etc.), usage of electric vehicles (such as the vehicle 112) compared to fossil fuel based vehicles that generates carbon emissions, or include even planting of trees to absorb and reduce carbon content from the environment. The energy regulatory authority 106 may also issue the tradable certificate to the entity that adopts innovative solutions to reduce greenhouse gas emissions during production and transportation. The energy regulatory authority 106 may include the electronic device 106A. The electronic device 106A may include suitable logic, circuitry, interfaces and/or code that may be configured to receive information related to the sustainable development activities and to issue the tradable certificate based on the sustainable development activity. For example, the electronic device 106A may be configured to receive the electric charging information from each of the plurality of electric charging facility devices 104, and further transmit first credit information (for example carbon credits or tradable certificate) to the plurality of electric charging facility devices 104. Examples of the energy regulatory authority 106 may include, but not limited to, National Clean Development Mechanism Authority (NCDMA), or Air Resources Board (ARB), Verified Carbon Standard (VCS) authority, or the like. Examples of the electronic device 106A associated with the energy regulatory authority 106 may include, but are not limited to, a computing device, a mainframe machine, a computer work-station, a smartphone, a cellular phone, a mobile phone, and/or any electronic device with data processing and networking capabilities.

The electric grid device 108A may include suitable logic, circuitry, interfaces and/or code that may be configured to manage and transfer electric charge to consumers (such as the plurality of electric charging facility devices 104) from the electric grid 108. The electric grid 108 may be a managed network of high voltage (HV) power transmission lines, sub-stations, low voltage (LV) distribution lines, and generation facilities (such as power plants). The electric grid 108 may be configured to deliver electric energy to the vehicle 112 through the plurality of electric charging facility devices 104. The electric grid 108 may be configured to deliver the electric energy to the plurality of electric charging facility devices 104 through various transmission and distribution lines. Example of the electric grid 108 may include, but are not limited to, a micro-grid, a national grid, a smart grid, and other electric energy generation facilities. In an embodiment, the electric grid device 108A may be configured to communicate data or information (for example a renewable energy certificate (REC) to the plurality of electric charging facility devices 104 for the purchase of the electric charge from the electric grid 108. The electric grid device 108A may be a communication device or an electronic device associated with the electric grid 108. Examples of the electric grid device 108A may include, but are not limited to, a computing device, a mainframe machine, a computer work-station, a smartphone, a cellular phone, a mobile phone, and/or any electronic device with data processing and networking capabilities.

The carbon generation authority 110 may be an entity who may be responsible for greenhouse gas emissions and corresponding carbon footprints in the environment. The carbon generation authority 110 may indulge in non-sustainable activities that generates harmful carbon emissions in the environment. The non-sustainable activities may include, but not limited to, petroleum oil production, fossil fuel usage in industrial production, fossil fuel usage in transportation, and the like. In order to indulge in such non-sustainable activities, the carbon generation authority 110 may be required to purchase the carbon credits or the tradable certificate (such as the carbon credit information) from the other entities (such as the plurality of electric charging facility devices 104) who performs the sustainable activities. The carbon generation authority 110 may include the communication device 110A to communicate with the server 102 (i.e. through the communication network 114) to purchase or receive the carbon credit information (for example second credit information received from one of the plurality of electric charging facility devices 104). Once the carbon credit information is purchased, the carbon generation authority 110 may be authorized to continue their non-sustainable activities, in accordance with offsetting amount of the purchased carbon credit information. In the network environment 100, there is shown only one carbon generation authority 110. However, one skilled in the art may understand that the carbon generation authority 110 shown in FIG. 1 is merely an example and there may be more such carbon generation authorities, without any deviation from the scope of the disclosure. Description of such carbon generation authorities are omitted from the disclosure for the sake of brevity. Examples of the carbon generation authority 110 may include, but are not limited to, Oil Industries, Production industries that uses fossil fuels, Transportation Vehicles that uses fossil fuels, and the like.

The vehicle 112 may include suitable logic, circuitry, and/or interfaces, which may be configured to receive the electric charge and use such electric charge for the transportation of the vehicle 112 or to run different electronic or electrical components/devices of the vehicle 112. To receive the electric charge, the vehicle 112 may communicate with at least one of the plurality of electric charging facility devices 104 directly via the electrical transmission line 116. The vehicle 112 may include a battery (not shown) to store the electric charge received from the one of the plurality of electric charging facility devices 104. The vehicle 112 may be a non-autonomous, a semi-autonomous, or an autonomous vehicle. Examples of the vehicle 112 may include, but are not limited to, an electric vehicle, a hybrid vehicle, and/or a vehicle that uses a combination of one or more distinct renewable and non-renewable power sources. The vehicle 112 that uses renewable and non-renewable power sources may include a fossil fuel-based vehicle, an electric propulsion-based vehicle, a hydrogen fuel-based vehicle, a solar-powered vehicle, and/or a vehicle powered by other forms of alternative energy sources. The vehicle 112 may further include the electronic apparatus 112A that may be configured to communicate with the server 102, via the communication network 114 for recommendation purposes, which is described, for example in FIG. 3. It may be noted that one vehicle 112 shown in FIG. 1 is merely an example. In an embodiment, there may be multiple vehicles which may be electrically charged by one or more of the plurality of electric charging facility devices 104, without any deviation from the scope of the disclosure.

The electronic apparatus 112A associated with the vehicle 112 may include suitable logic, circuitry, interfaces, and/or code that may be configured to communicate with the server 102 on behalf of the vehicle 112 via the communication network 114. For example, the electronic apparatus 112A may send a request to one of the plurality of electric charging facility devices 104 to receive the electric charge. In an embodiment, the electronic apparatus 112A may receive charging recommendation information from the server 102. The electronic apparatus 112A may be an in-vehicle infotainment system that may be integrated with the vehicle 112. The in-vehicle infotainment system may include suitable logic, circuitry, interfaces and/or code that may be configured to render at least an audio-based data, a video-based data, and/or a user interface to an occupant (not shown) of the vehicle 112. The in-vehicle infotainment system may be configured to execute one or more operations associated with the vehicle 112. Examples of the in-vehicle infotainment system may include, but are not limited, an entertainment system, a navigation system, a vehicle user interface (UI) system, an Internet-enabled communication system, and other entertainment systems. In some embodiments, the electronic apparatus 112A may be an electronic control unit (ECU) of the vehicle 112 or an electronic dashboard of the vehicle 112. In other embodiment, the electronic apparatus 112A may be a portable device that may be associated with the occupant of the vehicle 112. Examples of the portable device may include, but are not limited to, a computing device, a smartphone, a cellular phone, a mobile phone, a gaming device, a camera device, a computer work-station, a personal digital assistant (PDA) and/or a consumer electronic (CE) device.

The communication network 114 may include a communication medium through which the server 102, the plurality of electric charging facility devices 104, the electronic device 106A of the energy regulatory authority 106, the electric grid device 108A of the electric grid 108, the communication device 110A of the carbon generation authority 110, and the electronic apparatus 112A associated with the vehicle 112 may communicate with each other. The communication network 114 may be one of a wired connection or a wireless connection. Examples of the communication network 114 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 114 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the server 102 (for example an aggregator) may store registration information associated with the plurality of electric charging facility devices 104. The registration information may be identification information (for example a unique identifier, a location) associated with each of the plurality of electric charging facility devices 104. The plurality of electric charging facility devices 104 may be registered with the server 102 based on the stored registration information. The server 102 may be configured to receive electric charging information (such as vehicle charging data, a renewable energy certificate, etc.) recorded for a period of time (for example, certain hours, certain days, certain weeks, certain months, or more). The electric charging information may be received from each of the plurality of electric charging facility devices 104. For example, when the vehicle 112 is electrically charged from the first electric charging facility device 104A of the plurality of electric charging facility devices 104, the electric charging information of the vehicle 112 may be stored in a memory (not shown) of the first electric charging facility device 104A. The electric charging information may indicate an amount of electric charge provided by the first electric charging facility device 104A to the vehicle 112 or to other vehicles over the period of time (for example in last one week or in a particular month). The server 102 may receive the electric charging information from each of the plurality of electric charging facility devices 104.

The server 102 may further transmit, through the communication network 114, the received electric charging information to the electronic device 106A associated with the energy regulatory authority 106. The electronic device 106A of the energy regulatory authority 106 may validate an authenticity of the received electric charging information (or of the corresponding electric charging facility device), and may generate the first credit information (which may be the tradable certificate, or the carbon credits). The first credit information may be calculated based on the received electric charging information. The details of the calculation of the first credit information is described, for example, in FIG. 3A. The server 102 may be further configured to receive the first credit information from the electronic device 106A, based on the transmitted electric charging information.

The server 102 may further transmit, through the communication network 114, the received first credit information to each of the plurality of electric charging facility devices 104 or the first electric charging facility device 104A from which the electric charging information may be received. The plurality of electric charging facility devices 104 may be configured to store the first credit information that may be transmitted from the server 102. Each of the plurality of electric charging facility devices 104 may utilize the received first credit information for monetization purposes, such as monetary transactions, based on selling a partial or complete first credit information to other entities (such as the carbon generation authority 110). As an additional advantage, the plurality of the electric charging facility devices 104 may even utilize the first credit information (i.e. carbon credits) to offset their own carbon footprint, which may have generated through the non-sustainable activities (such as a fossil fuel consumption for production and transportation of electric charge).

The server 102 may further receive, through the communication network 114, a request (such as the carbon credit offset request) from the communication device 110A associated with the carbon generation authority 110 (such as the oil industry). The communication device 110A may be different from the electronic device 106A associated with the energy regulatory authority 106. The server 102 may further transmit the received request from the communication device 110A to each of the plurality of electric charging facility devices 104 through the communication network 114. The received request may relate to the carbon offset that may be required for the carbon generation authority 110 to indulge in non-sustainable activities (such as petroleum oil production, fossil fuel usage in industrial production, fossil fuel usage in transportation).

The server 102 may further receive, through the communication network 114, the second credit information (such as offset carbon credit information that may match with the carbon offset request of the carbon generation authority 110) from at least one of the plurality of electric charging facility devices 104. The second credit information may be portion of the first credit information stored at the corresponding electric charging facility device (such as the first electric charging facility device 104A). The server 102 may further transmit the received second credit information to the carbon generation authority 110 through the communication network 114. The server 102 may further receive the monetary information (such as digital money) from the carbon generation authority 110 based on the transmitted second credit information. The server 102 may further transmit the received monetary information to the corresponding electric charging facility device from which the second credit information may be received. The collaborative management of the electric charging information, the first credit information, the second credit information, and the monetary information is further described, for example, in FIGS. 3A-3C.

Figure 2:
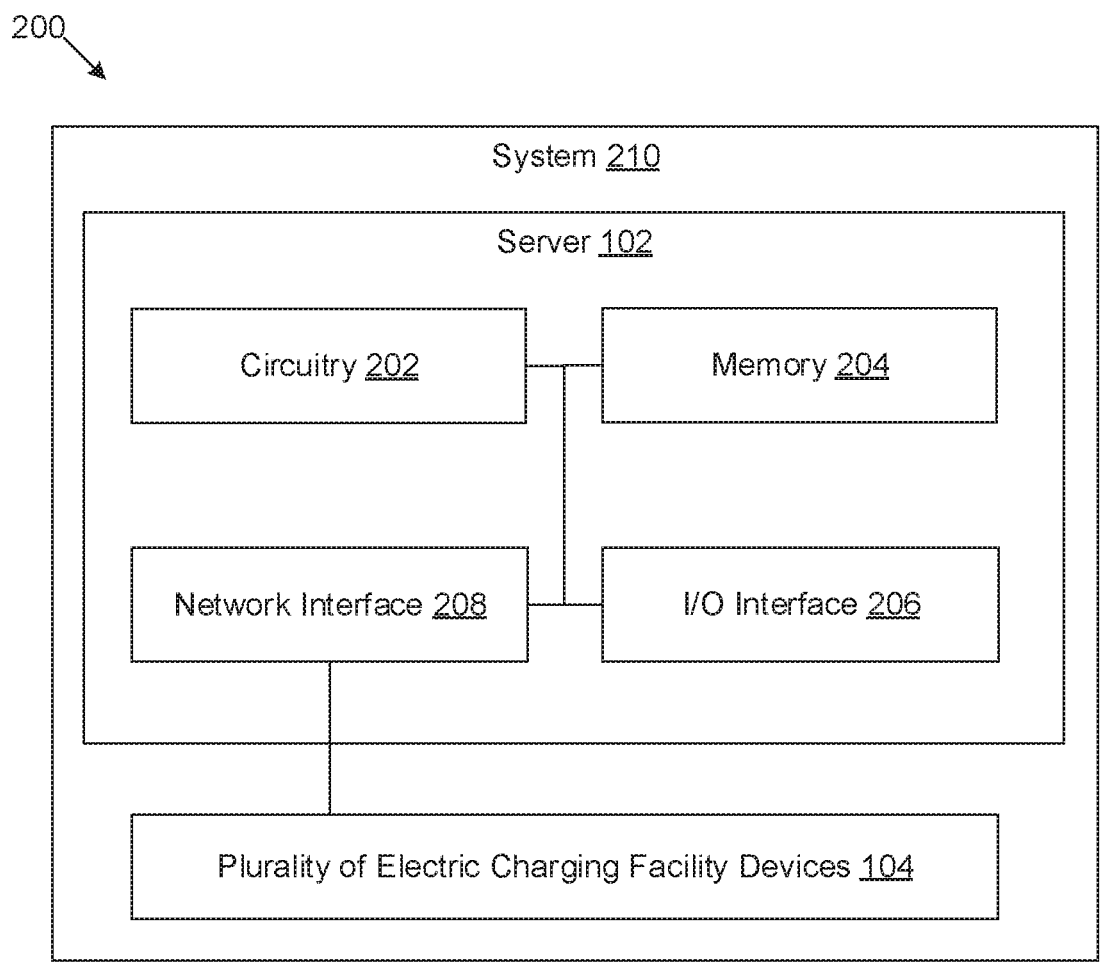
FIG. 2 is a block diagram that illustrates an exemplary server of FIG. 1 for the credit management, in accordance with an embodiment of the disclosure.

FIG. 2 is a block diagram that illustrates an exemplary server of FIG. 1 for the credit management, in accordance with an embodiment of the disclosure. FIG. 2 is explained in conjunction with elements from FIG. 1. With reference to FIG. 2, there is shown a block diagram 200 of the server 102. The server 102 may include circuitry 202, a memory 204, an I/O device 206, and a network interface 208. The circuitry 202 may be coupled to the memory 204, the I/O device 206, and the network interface 208, through wired or wireless connections of the communication network 114.

The circuitry 202 may include suitable logic, circuitry, and/or interfaces that may be configured to execute program instructions associated with different operations to be executed by the server 102. For example, some of the operations may include, but not limited to, reception of electric charging information from the plurality of electric charging facility devices 104, transmission of the received electric charging information from each of the plurality of electric charging facility devices 104 to the electronic device 106A associated with the energy regulatory authority 106, reception of the first credit information from the electronic device 106A based on the transmitted electric charging information, and transmission of the first credit information to each of the plurality of electric charging facility devices 104. The execution of operations is further explained, for example, in FIGS. 3A-3C.

The circuitry 202 may include any suitable special-purpose or general-purpose computer, computing entity, or processing device including various computer hardware or software modules and may be configured to execute instructions stored on any applicable computer-readable storage media (for example the memory 204). The circuitry 202 may be implemented based on a number of processor technologies known in the art. For example, the circuitry 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry 202 may include any number of processors configured to, individually or collectively, perform any number of operations of the server 102, as described in the present disclosure. Examples of the circuitry 202 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 204 may include suitable logic, circuitry, interfaces, and/or code that may be configured to store the set of instructions executable by the circuitry 202. The memory 204 may be configured to store the registration information for the plurality of electric charging facility devices 104. The memory 204 may be further configured to store the electric charging information, the first credit information, the second credit information, and the monetary information. Examples of implementation of the memory 204 may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive user inputs and generate outputs in response to the received user inputs. The I/O device 206 may receive the registration information associated with a new electric charging facility device as the user-input. For example, the server 102 may receive the user-input from an executive of the organization associated with or handling the server 102 for the credit management. The registration information may indicate a unique identifier or a location where the new electric charging facility device is positioned. The I/O device 206 may include various input and output devices, may be configured to communicate with the circuitry 202. Examples of the I/O device 206 may include, but are not limited to, a touch screen, a keyboard, a mouse, a joystick, a microphone, a display device, a speaker, and/or an image sensor.

The network interface 208 may include suitable logic, circuitry, and interfaces that may be configured to facilitate communication between the circuitry 202, the plurality of electric charging facility devices 104, the electronic device 106A of the energy regulatory authority 106, the electric grid device 108A of the electric grid 108, the communication device 110A of the carbon generation authority 110, and the electronic apparatus 112A of the vehicle 112, via the communication network 114. The network interface 208 may be implemented by use of various known technologies to support wired or wireless communication of the server 102 with the communication network 114. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

Although in FIG. 2, it is shown that the server 102 includes the circuitry 202, the memory 204, the I/O device 206, and the network interface 208, the disclosure should not be construed as limiting the server 102 and may include more or less components to perform the same or other functions of the server 102. Details of the other functions and the components have been omitted from the disclosure for the sake of brevity. The functions or operations executed by the server 102, as described in FIG. 1, may be performed by the circuitry 202. Operations executed by the circuitry 202 are described, for example, in the FIGS. 3A-3C. It may be noted that the server 102 may be combined with the plurality of electric charging facility devices 104 to form a system (such as a system 210, as shown in FIG. 2). The plurality of electric charging facility devices 104 may be communicably coupled with the network Interface 208, via a communication network (such as the communication network 114, as shown in FIG. 1).

Figure 3A:
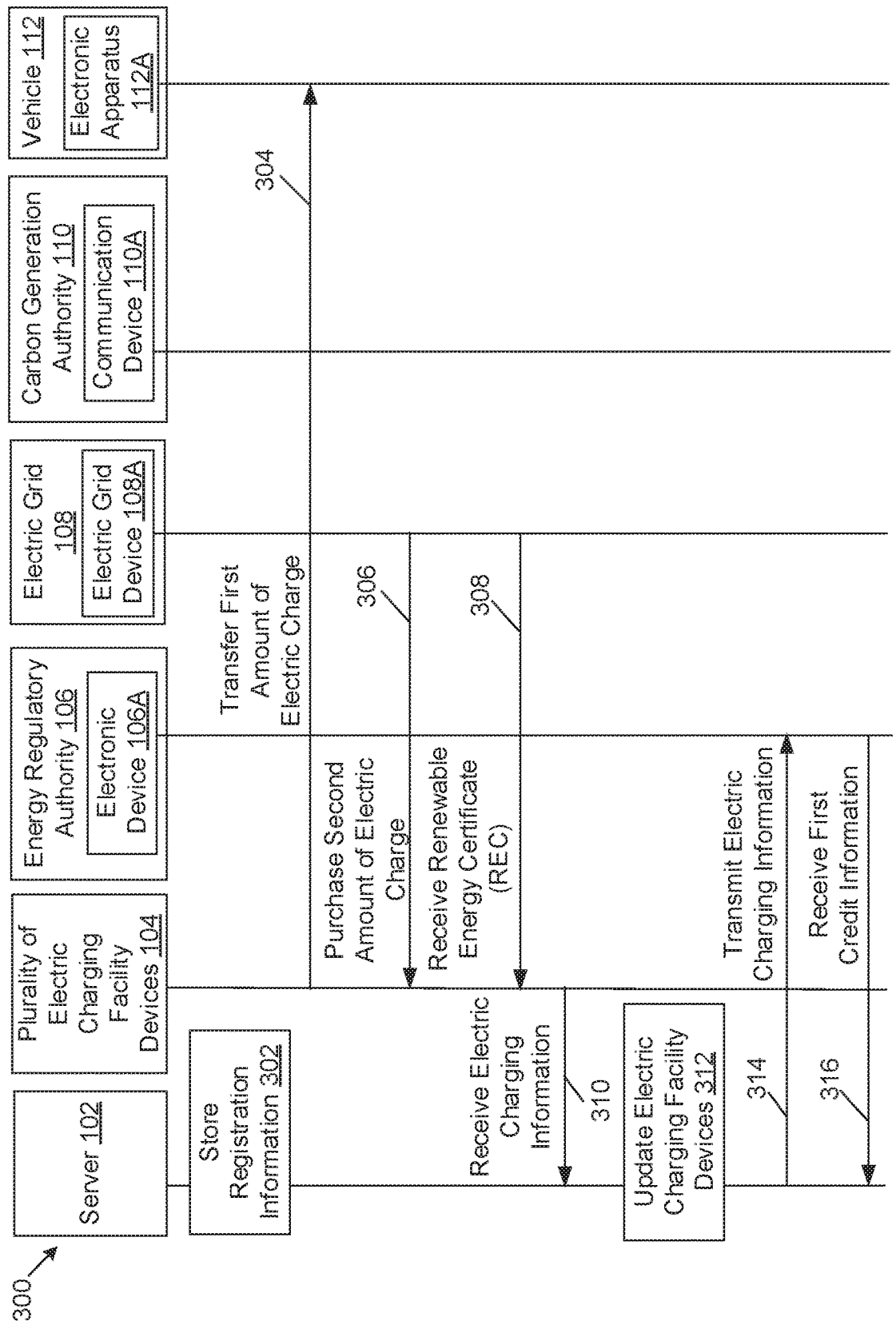
FIGS. 3A-3C collectively depict a sequence diagram that illustrates exemplary operations for the credit management by the server of FIG. 1, in accordance with an embodiment of the disclosure.
Figure 3B:
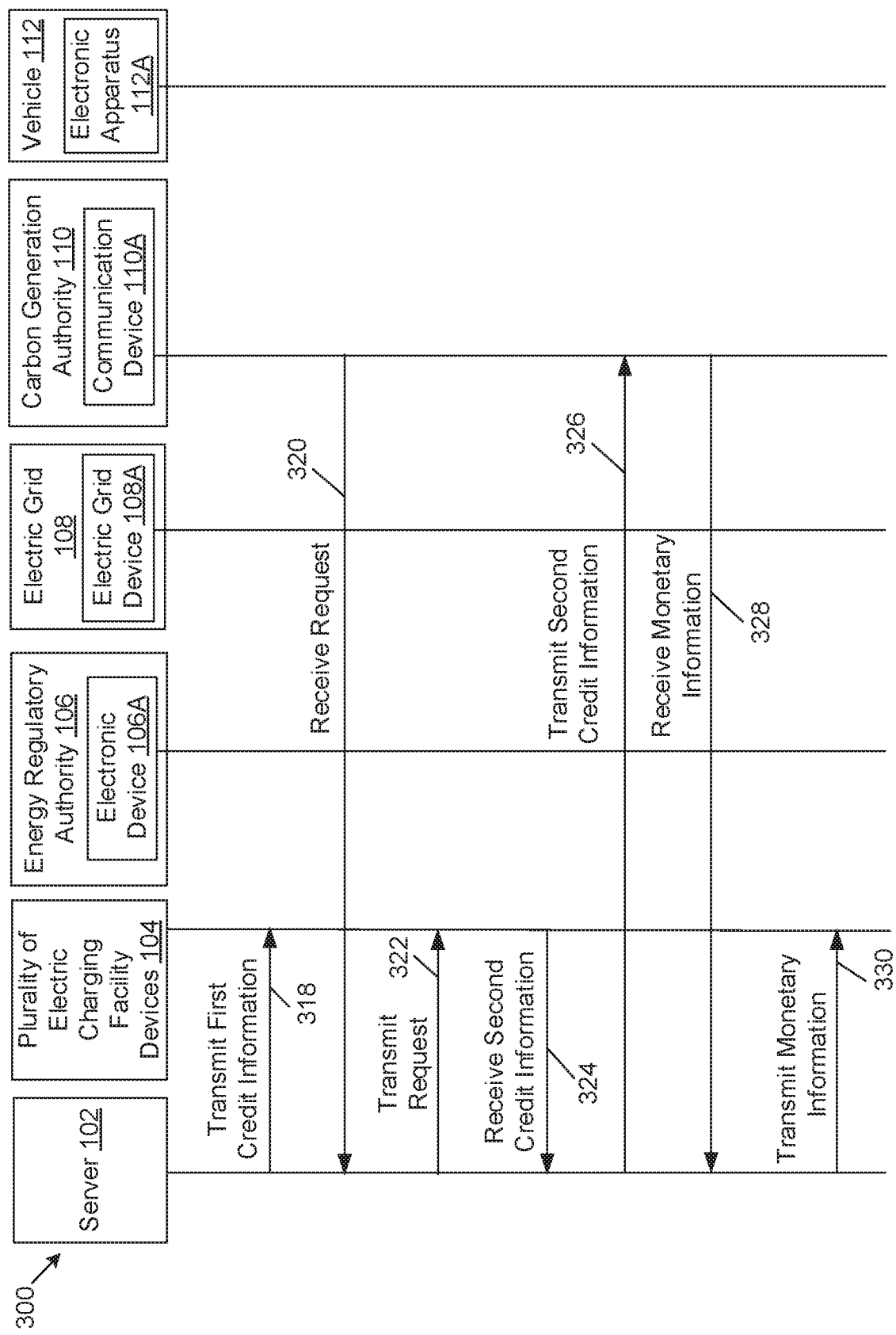
Figure 3C:
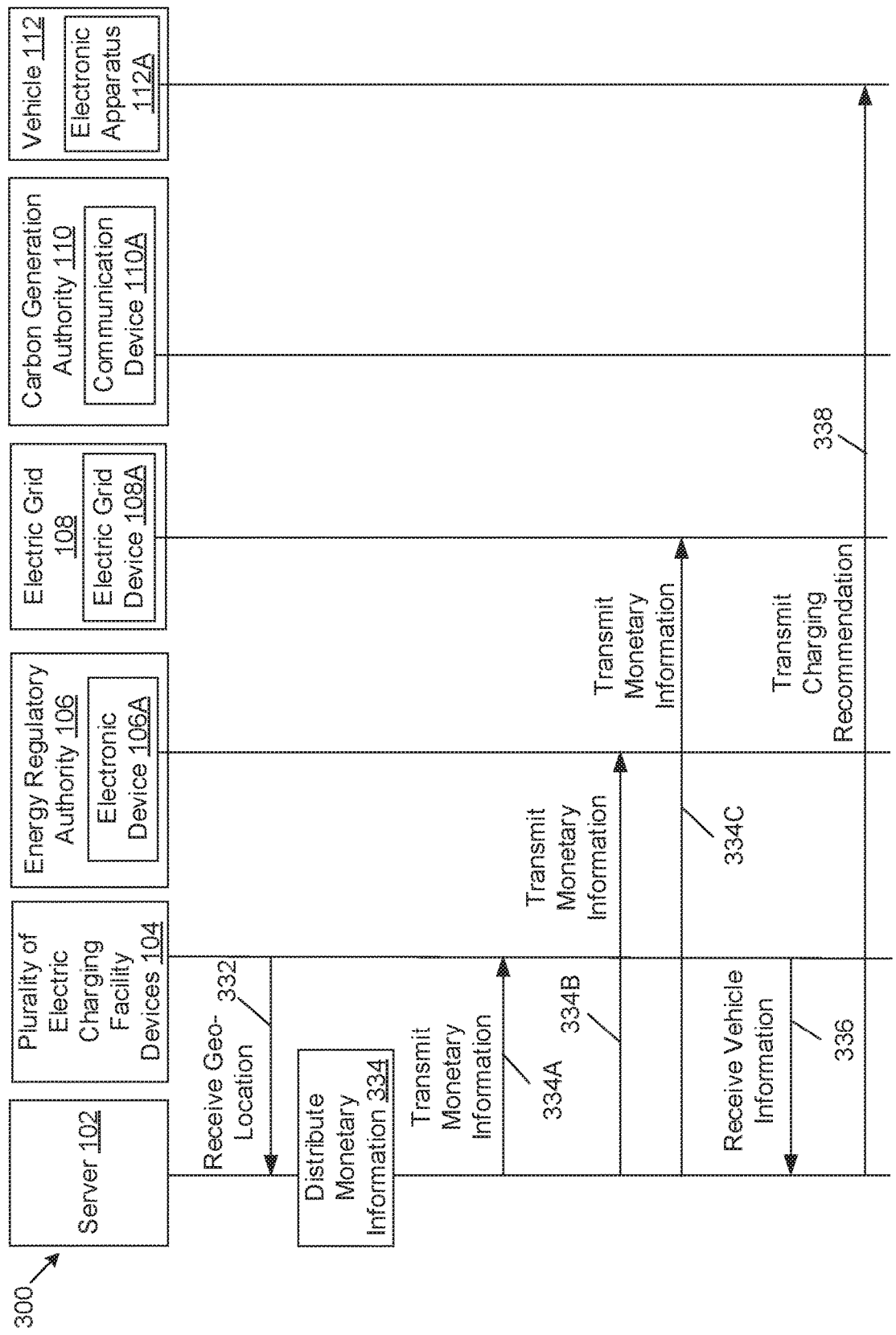

FIGS. 3A-3C collectively depict a sequence diagram that illustrates exemplary operations for credit management by the server 102 of FIG. 1, in accordance with an embodiment of the disclosure. FIGS. 3A-3C are explained in conjunction with elements from FIG. 1 and FIG. 2. With reference to FIGS. 3A-3C, there is shown a sequence diagram 300 of exemplary operations handled by the server 102 or the circuitry 202 for the management of credits. In FIGS. 3A-3C, the server 102 or the circuitry 202 performs the exemplary operations from 302 to 338, which relates to management of the first credit information (such as the carbon credit information, or the tradable certificate).

At 302, registration information storage operation may be performed. In an embodiment, the server 102 may be configured to store the registration information related to the plurality of electric charging facility devices 104. The registration information may be stored in the memory 204 of the server 102. The registration information may include, but not limited to, a geo-location of each of the plurality of electric charging facility devices 104, identification information (i.e. unique identifier) associated with each of the plurality of electric charging facility devices 104, an electric charge cost to be taken from an occupant/owner of the vehicle 112, or any discount offer information (i.e. discount provided during selling of electric charge) associated with each of the plurality of electric charging facility devices 104. The plurality of electric charging facility devices 104 may be registered with the server 102. The server 102 may be configured to receive the registration information from each of the plurality of electric charging facility devices 104 registered with the server 102. In an embodiment, based on the stored registration information, the server 102 may recommend, one of a nearest electric charging facility device from the plurality of electric charging facility devices 104, cost of charging or offered discounts, to the electronic apparatus 112A associated with the vehicle 112 for charging operation.

At 304, the charging operation may be performed on the vehicle 112. In an embodiment, when the vehicle 112 reaches at one of the nearest electric charging facility device (for example the first electric charging facility device 104A) from the plurality of electric charging facility devices 104, the first electric charging facility device 104A may be configured to transfer a first amount of electric charge to the vehicle 112. In an embodiment, the first amount of electric charge may be related to a charging requirement of the vehicle 112. For example, when the vehicle 112 is coupled with the first electric charging facility device 104A, the first electric charging facility device 104A may be configured to determine a current battery level of the vehicle 112, and the charging requirement or remaining charge that may be needed to fully charge the battery or charge the battery to a predefined state of charge (SOC), for example till 90% of existing capacity of the battery of the vehicle 112. Based on the determination of the remaining charge, the first electric charging facility device 104A may be configured to transfer the electric charge to the battery of the vehicle 112, via the electrical transmission line 116.

In some embodiment, the first electric charging facility device 104A may receive a request (not shown in FIG. 3A) from the electronic apparatus 112A of the vehicle 112 to transfer the electric charge to the vehicle 112. In an embodiment, the received request may include the first amount of electric charge to be transferred to the vehicle 112. In an embodiment, if the battery of the vehicle 112 is completely charged, the first electric charging facility device 104A may disconnect an internally power supply with the vehicle 112 or may stop the transmission of the electric charge to the vehicle 112. The first electric charging facility device 104A may record the first amount of electric charge transferred to the vehicle 112. The first electric charging facility device 104A may also record a number of times the first amount of electric charge transferred to the vehicle 112 or total amount of electric charge transferred to the vehicle 112 over a period of time (say, for example, in last 24 hours, in last one week, in last one month, and the like). Similarly, each of the plurality of electric charging facility devices 104 may record the total electric charge transferred to the vehicle 112 or to different vehicles. In an embodiment, in case the first electric charging facility device 104A has insufficient amount of electric charge that may not match the charging requirement, the first electric charging facility device 104A may purchase second amount of electric charge from the electric grid device 108A of the electric grid 108.

At 306, purchase operation of the second amount of electric charge may be performed. In an embodiment, the plurality of electric charging facility devices 104 may be configured to purchase the second amount of electric charge from the electric grid device 108A of the electric grid 108 based on the electric charge available in the plurality of electric charging facility devices 104. For example, when there is insufficient electric charge available in the first electric charging facility device 104A, the first electric charging facility device 104A may be configured to calculate a required electric charge (which may be the second amount of electric charge to purchase), and transmit a request about the required electric charge to the electric grid device 108A of the electric grid 108. The electric grid device 108A may receive the request about the required electric charge from the first electric charging facility device 104A and may further control the transfer of the required second amount of electric charge from the electric grid 108 to the first electric charging facility device 104A. In an exemplary scenario, the plurality of electric charging facility devices 104 may purchase and stock the second amount of electric charge from the electric grid 108 during an offer period (such as when the electric grid 108 supplies the electric charge at a lower price), such that when there is the charging requirement for the vehicle 112, the plurality of electric charging facility devices 104 may supply the first amount of electric charge to the vehicle 112 at a profitable margin. For example, the profitable margin of the first amount of electric charge is a market value or cost that may be higher than the market value or cost of the second amount of electric charge. In addition to the profitable margin, the plurality of electric charging facility devices 104 may also receive a Renewable Energy Certificate (REC) from the electric grid device 108A associated with the electric grid 108.

At 308, the reception operation of the Renewable Energy Certificate (REC) may be performed. In an embodiment, the electric grid 108 may issue the Renewable Energy Certificate (REC) to the plurality of electric charging facility devices 104. Each of the plurality of electric charging facility devices 104 may receive the renewable energy certificate (REC) from the electric grid device 108A of the electric grid 108, based on the purchase of the second amount of electric charge from the electric grid 108. For example, when the first electric charging facility device 104A purchases the second amount of electric charge from the electric grid device 108A of the electric grid 108 that may operate at a sustainable energy (such as a wind power, or a solar power), the purchase may add up to the sustainable development activity (such as usage of renewable energy). Based on the quantity of the purchase of the second amount of electric charge, the electric grid device 108A may issue the Renewable Energy Certificate (REC) to the first electric charging facility device 104A or the plurality of electric charging facility devices 104. In an embodiment, the plurality of electric charging facility devices 104 may be configured to transmit the Renewable Energy Certificate (REC) as the electric charging information or as a part of the electric charging information to the server 102. It may be noted that the charging operation (at 304) performed prior to the purchase operation (at 306) in FIG. 3A is merely an example. In another embodiment, the purchase operation of the second amount of electric charge amount (at 306) and the reception operation of the REC (at 308) may be performed prior to the charging operation (at 304) for one or more of the plurality of electric charging facility devices 104, without any deviation from the scope of the disclosure.

At 310, a reception operation of the electric charging information may be performed. In an embodiment, the circuitry 202 of the server 102 may be configured to receive the electric charging information from the plurality of electric charging facility devices 104. When the plurality of electric charging facility devices 104 charge the vehicle 112 or other electric vehicles, the plurality of electric charging facility devices 104 may be configured to record the electric charging information. During the charging operation (at 304), the electric charging information (such as the charging data of the vehicle 112) may be generated or recorded. For example, the electric charging information may include, but not limited to, the renewable energy certificate (REC), the first amount of electric charge provided over the period of time (such as in a day, in a week, in a month, and the like), vehicle information (such as a registration number of the vehicle 112, a battery level at a time of charge of the vehicle 112), date-time information (such as a date and time when the vehicle 112 or other vehicle is charged), identification information (such as a license number, a registration number, or an identification number) associated with the corresponding electric charging facility device (such as one of the plurality of electric charging facility devices 104), or location information (such as a geo-location or a postal address) associated with the corresponding electric charging facility device. In an embodiment, based on the received electric charging information, the server 102 may be configured to control operations of the plurality of electric charging facility devices 104. The circuitry 202 of the server 102 may receive the electric charging information from the plurality of electric charging facility devices 104 to identify which electric charging facility device has transferred how much electric charge in a particular period of time to the vehicle 112 or other vehicles. The electric charging information may also indicate the vehicles charged by a particular electric charging facility device (such as the first electric charging facility device 104A) in the particular time period (say in last one week). In some embodiment, the circuitry 202 may transmit a request to each of the plurality of electric charging facility devices 104 to receive the electric charging information. The request may include the period of time for which the recorded electric charging information may be provided by each of the plurality of electric charging facility devices 104 registered with the server 102.

At 312, update registration information operation of the plurality of electric charging facility devices 104 may be performed. In an embodiment, the circuitry 202 of the server 102 may update a number of the plurality of electric charging facility devices 104 registered with the server 102 based on the electric charging information received from each of the plurality of electric charging facility devices 104. The server 102 may further update the stored registration information based on the updated number of the plurality of electric charging facility devices 104. The circuitry 202 of the server 102 may control the memory 204 to store the updated registration information. For example, in case, the server 102 receives the electric charging information from a particular electric charging facility device, that may indicate a minimal amount of electric charge transferred to vehicles in the period of time in comparison to rest of the plurality of electric charging facility devices 104, the server 102 may suggest for closure or unregister such unused or underutilized electric charging facility device. The minimal amount of the electric charge may be an electric charge amount below a particular threshold. In other example, in case, the server 102 receives the electric charging information from a particular electric charging facility device (located in a particular geographical location), which may indicate that a maximum amount of electric charge transferred to vehicles in comparison to rest of the plurality of electric charging facility devices 104, the server 102 may suggest to deploy an additional electric charging facility device to tap more profit from such geographical location or share the charging load from the particular electric charging facility device. In a specific embodiment, the server 102 may transfers the received electric charging information to the electronic device 106A associated with the energy regulatory authority 106.

At 314, transmission operation of the electric charging information may be performed. In an embodiment, the circuitry 202 of the server 102 may be configured to transfer the received electric charging information to the electronic device 106A associated with the energy regulatory authority 106. For example, when the server 102 receives the electric charging information from each of the plurality of electric charging facility devices 104 recorded over the period of time (such as a day, or a week, and the like), the server 102 may be configured to store such electric charging information. When the stored first amount of electric charge indicated by the electric charging information reaches a threshold level (such as a cap limit of the electric charge amount that may be stored in the server 102 for a particular electric charging facility device), the server 102 may be configured to transmit the stored electric charging information to the electronic device 106A associated with the energy regulatory authority 106. In some embodiments, the circuitry 202 of the server 102 may transmit the electric charging information received from the plurality of electric charging facility devices 104 on regular basis (for example every day, every week, or every month). Based on the transmission of the electric charging information, the energy regulatory authority 106 may be regularly updated about information that how much electric energy may be utilized or transferred to the vehicles by different plurality of electric charging facility devices 104 of different geolocations (for example in a particular city, town, street, or state). Based on the transmitted electric charging information, the electronic device 106A may generate the first credit information.

At 316, reception operation of the first credit information may be performed. In an embodiment, the circuitry 202 of the server 102 may be configured to receive the first credit information from the electronic device 106A associated with the energy regulatory authority 106. For example, the first credit information may be generated or calculated by the electronic device 106A of the energy regulatory authority 106 in accordance with the first amount of electric charge indicated in the received electric charging information for each of the plurality of electric charging facility devices 104. The first credit information may relate to the tradable certificate (such as the carbon credit information). In an embodiment, the first credit information may be associated with the low-carbon fuel standard (LCFS). For example, the server 102 may receive one carbon credit from the electronic device 106A for 3MWh amount of the electric charge mentioned in the electric charging information, transmitted to the electronic device 106A of the energy regulatory authority 106 (at 314). In an example, a number of the carbon credits may be higher based on a higher first amount of electric energy indicated in the electric charging information which may be received from a particular electric charging facility device (such as the first electric charging facility device 104A). The server 102 may be configured to receive the first credit information for one or more of the plurality of electric charging facility devices 104 from the electronic device 106A in accordance with the transmitted electric charging information. For example, in case the first electric charging facility device 104A transfers more electric charge to different vehicles or other electrical devices in the period of time, then the server 102 may receive more number of carbon credits (i.e. first credit information) for the first electric charging facility device 104A. Upon receipt the first credit information, the server 102 may be configured to transmit such first credit information to the plurality of electric charging facility devices 104.

At 318, transfer operation of the first credit information may be performed. In an embodiment, the circuitry 202 of the server 102 may be configured to transmit the first credit information to each of the plurality of electric charging facility devices 104. The server 102 may transmit the first credit information based on the electric charging information received from each of the plurality of electric charging facility devices 104. In an embodiment, the first credit information (for example, the number of carbon credits) associated with the first electric charging facility device 104A may be different from the first credit information (for example the number of carbon credits) associated with the second electric charging facility device 104B. For example, in case the server 102 receives the electric charging information (that indicate a lower value of the first amount of electric charge) from one of the plurality of electric charging facility devices 104, such electric charging facility device may be provided with lower number or value of the first credit information (for example, minimum carbon credits). In other example, in case the server 102 receive the electric charging information (that indicate a higher value of the first amount of electric charge) from one of the plurality of electric charging facility devices 104, such electric charging facility device may be provided with a higher number or value of the first credit information (for example, maximum carbon credits).

In some embodiments, the first credit information may be calculated based on a geo-location of each of the plurality of electric charging facility devices 104. For example, if there are low number of electric charging facility devices deployed in a particular geo-location (for example on a street, locality, town, city, or state), the total amount of electric charge indicated in the electric charging information, that may be transferred to the energy regulatory authority 106, may be limited or low. Because of the limited amount of electric charge, the electric charging facility devices in the particular geo-location may receive a limited number of carbon credits (i.e. first credit information), which may further create a high demand for the limited number of carbon credits for the particular geo-location. Because of the high demand, the market value (such as a pricing information for the carbon credits) of the first credit information may be increased. In other example, if there is a higher number of electric charging facility devices in a particular geo-location, the total amount of electric charge indicated in the electric charging information (that may be transferred to the energy regulatory authority 106) may be higher. Because of the higher amount of electric charge, the electric charging facility devices in the particular geo-location may receive a higher number of carbon credits (i.e. first credit information), which may further create a low demand for the higher number of carbon credits for the particular geo-location. Because of the lower demand, the market value (such as a pricing information for the carbon credits) of the first credit information may be decreased. In accordance with an embodiment, each of the plurality of electric charging facility devices 104 may be configured to utilize the received first credit information for monetization purposes. In another embodiment, the plurality of such electric charging facility devices 104 may even utilize the received first credit information to offset their own carbon footprint, which may have generated through the non-sustainable activities (such as a fossil fuel consumption for production and transportation of electric charge).

At 320, reception operation of a request may be performed. In an embodiment, the circuitry 202 of the server 102 may receive the request (such as a purchase request, or the offset carbon credit request) from the communication device 110A of the carbon generation authority 110. For example, in order to indulge in the non-sustainable activities, the carbon generation authority 110 may be required to purchase the tradable certificate (such as the carbon credits) from the other entities (such as the plurality of electric charging facility devices 104) who performs the sustainable activities. Hence, the communication device 110A of the carbon generation authority 110 may generate the request for the server 102. In an embodiment, there may be only one request that may be generated over a time period (for example once in a month, quarter, or year) from the communication device 110A of the carbon generation authority 110. In other words, the circuitry 202 of the server 102 may receive such request from the communication device 110A of the carbon generation authority 110. In another embodiment, there may be a plurality of requests from each of a plurality of carbon generation authorities (not shown). The server 102 may receive such plurality of requests from the corresponding communication device of each of the carbon generation authorities. In case, if there are plurality of requests, the server 102 may initiate an auction (such as bidding between communication devices of each of the carbon generation authorities) to purchase the carbon credits. For example, in case there are limited first credit information available with the plurality of electric charging facility devices 104, and there may be an increased demand for such first credit information (or carbon credit), the server 102 may initiate the auction of the first credit information at a base market value (such as a threshold price) between the carbon generation authorities. The server 102 may receive responses (for example a bid value to purchase carbon credits) from the communication device 110A of the each of the carbon generation authorities. Based on the received responses, the server 102 may accept and receive the request from the communication device 110A of a particular carbon generation authority 110A, which responded with a highest bid compared to other carbon generation authorities. In other example, in case, there are plurality of requests received from multiple carbon generation authorities, the server 102 may accept all the requests from each of the communication device 110A associated with each of the carbon generation authorities.

At 322, transmission operation of the request may be performed. In an embodiment, the circuitry 202 of the server 102 may transmit the received request (i.e. to purchase the carbon credits) to the plurality of electric charging facility devices 104. The server 102 may transmit the request to the plurality of electric charging facility devices 104 in accordance with the request received from the communication device 110A associated with the carbon generation authority 110. For example, in case the server 102 receives a single request from the communication device 110A of the carbon generation authority 110, the server 102 may transmit the single request to the plurality of electric charging facility devices 104. In other example, in case the server 102 receives the plurality of requests from the corresponding communication device 110A of the plurality of carbon generation authorities, the server 102 may transfer the plurality of requests to each of the plurality of electric charging facility devices 104. In some embodiments, the circuitry 202 of the server 102 may transmit the request to one of the plurality of electric charging facility devices 104 (for example the first electric charging facility device 104A) based on the number of carbon credits (i.e. first credit information) available with the one of the plurality of electric charging facility devices 104. The number of the available carbon credits indicated by the first credit information for each of the plurality of electric charging facility devices 104 may be known to the server 102, as the server 102 provides the first credit information to the plurality of electric charging facility devices 104 based on the received electric charging information (at 318).

At 324, reception operation of the second credit information may be performed. In an embodiment, the circuitry 202 of the server 102 may receive the second credit information from the one of the plurality of electric charging facility devices 104 (for example the first electric charging facility device 104A). The second credit information may relate to, but not limited to, the offset carbon credit information (such as the offset carbon credits) that may match with the received request (such as the carbon offset request at 320) from the communication device 110A associated with the carbon generation authority 110. In an example, the second credit information may indicate a number of carbon credits that may be indicated in the request received from the communication device 110A at 320. The second credit information may be a subset of the first credit information available at the first electric charging facility device 104A. Therefore, the second credit information may be different from the first credit information. In some embodiments, the second credit information received from the first electric charging facility device 104A may be same as the first credit information available at the first electric charging facility device 104A, if the number of carbon credits mentioned in the request from the communication device 110A, is similar to the carbon credits available at the first electric charging facility device 104A. In some embodiments, if the server 102 transmitted plurality of requests (i.e. received from the multiple carbon generation authorities) to the plurality of electric charging facility devices 104, the server 102 may receive the second credit information from multiple of electric charging facility devices 104 based on the first credit information available at the corresponding electric charging facility device.

At 326, transmission operation of the second credit information may be performed. In an embodiment, the circuitry 202 of the server 102 may transmit the received second credit information to the communication device 110A (associated with the carbon generation authority 110) from where the request may be received at 320 to purchase the carbon credits. In case of receipt of multiple purchase requests for the carbon credits, the server 102 may transmits the corresponding second credit information to the communication device 110A associated with each of the carbon generation authorities.

At 328, reception operation of the monetary information may be performed. In an embodiment, the circuitry 202 of the server 102 may receive the monetary information from the communication device 110A associated with the carbon generation authority 110. The monetary information may be generated by the communication device 110A, based on the received second credit information at 326. The monetary information may correspond to, but not limited to, a digital money, monetary points, or redeemable points). The communication device 110A may provide the monetary information for the purchase of the second credit information (i.e. carbon credits) from one or more of the plurality of electric charging facility devices 104. In case, the server 102 transmits the second credit information to multiple communication devices associated with multiple carbon generation authorities, the circuitry 202 of the server 102 may receive the monetary information from each communication device (such as the communication device 110A) associated with the multiple carbon generation authorities. The server 102 may then further distribute the received monetary information to corresponding one or more of the plurality of electric charging facility devices 104 which may have provided the second credit information.

At 330, transmission operation of the monetary information may be performed. In an embodiment, the circuitry 202 of the server 102 may transmit the received monetary information to one or more of the plurality of electric charging facility devices 104. The server 102 may be configured to transmit the monetary information based on the second credit information received from the plurality of electric charging facility devices 104 (at 324). Based on the receipt of the monetary information, the one or more of the plurality of electric charging facility devices 104 may earn the monetary benefits for the selling of the carbon credits (i.e. second credit information).

At 332, reception operation of geo-location may be performed. In an embodiment, the circuitry 202 of the server 102 may receive geo-location of the plurality of electric charging facility devices 104. In some embodiments, the geo-location may be extracted from the electric charging information received from the plurality of electric charging facility devices 104 (at 310). Based on the geo-location of the plurality of electric charging facility devices 104, the monetary information corresponding to the second credit information may be calculated. For example, if the first electric charging facility device 104A is installed in a geo-location that has a minimal mobility of electric vehicles and/or minimal charging activity of the electric vehicles with the first electric charging facility device 104A, the monetary information may be higher than the market value (such as a threshold pricing) because of the demand of the electric charge by the vehicles. In other example, if the first electric charging facility device 104A is installed in a geo-location that has a maximum mobility of electric vehicles and/or maximum charging activity for the electric vehicles with the first electric charging facility device 104A, the monetary information may be lower than the market value (such as a threshold pricing) because of the increased supply of the electric charge for the vehicles (such as the vehicle 112). In an embodiment, the monetary information may be calculated based on the receipt of the purchase request (at 320) to provide the second credit information to the communication device 110A of the carbon generation authority 110.

At 334, distribution operation of the monetary information may be performed. In an embodiment, the circuitry 202 of the server 102 may distribute the received monetary information among one or more the plurality of electric charging facility devices 104, the energy regulatory authority 106, the electric grid 108, and the server 102, rather than transmission of the monetary information completely to the first electric charging facility device 104A, as described at 330, (i.e. from which the second credit information may be received). In an embodiment, the distribution of the monetary information may be based on a contribution in generation of the second credit information from the one or more of the plurality of electric charging facility devices 104, the energy regulatory authority 106, the electric grid 108, and the server 102. Upon distribution of the monetary information, the server 102 may transmit the distributed monetary information to the plurality of electric charging facility devices 104 (which provided the carbon credits as the second credit information at 324), the electronic device 106A of the energy regulatory authority 106 (i.e. which provides the carbon credits as the first credit information at 316), and the electric grid 108 (which provides the electric charge to the plurality of electric charging facility devices 104 at 306). For example, at 334A, the server 102 may transmit a part of the distributed monetary information to one or more of the plurality of electric charging facility devices 104. In other example, at 334B, the server 102 may transmit a part of the distributed monetary information to the electronic device 106A associated with the energy regulatory authority 106. In other example, at 334C, the server 102 may transmit a part of the distributed monetary information to the electric grid device 108A of the electric grid 108. In an example, in case, the server 102 receives particular monetary information (for example, $180 per carbon credit) from the carbon generation authority 110 based on a number of carbon credits that has been transferred from the server 102, the circuitry 202 may distribute a first part (for example, 30%) of the particular monetary information to the plurality of electric charging facility devices 104. The circuitry 202 may further distribute a second part (for example, 20%) of the particular monetary information to a dealer of the plurality of electric charging facility devices 104, wherein the dealer facilitates an accommodation of the plurality of electric charging facility devices 104. The circuitry 202 may further distribute a third part (for example, 30%) of the particular monetary information to the electric grid 108, to purchase Renewable Energy Certificates. The circuitry 202 may further distribute a fourth part (for example, 20%) of the particular monetary information to the server 102 for the management of carbon credits.

Therefore, the server 102 (as the aggregator) may effectively collaborate between each of the plurality of electric charging facility devices 104, the energy regulatory authority 106, the electric grid 108, and the carbon generation authority 110. Based on the collaboration performed by the disclosed server 102, the plurality of electric charging facility devices 104 may collect the carbon credits from the energy regulatory authority 106 based on the provided electric charging information. Further, based on the collaboration performed of the server 102, it may be easier for the carbon generation authority 110 to transact with the plurality of electric charging facility devices 104 and collect the carbon credits for offsetting purposes. Further, based on the collaboration performed of the server 102, it may be easier for the multiple parties (such as the plurality of electric charging facility devices 104, the energy regulatory authority 106, and the electric grid 108) to distribute monetary information and earn monetary benefits. Additionally, the disclosed server 102 may also collaborate with the vehicle 112 and generate control instructions for the vehicle based on vehicle information of the vehicle 112.

At 336, reception operation of vehicle information may be performed. In an embodiment, the server 102 may receive the vehicle information about the vehicle 112 from the plurality of electric charging facility devices 104 (such as the first electric charging facility device 104A). In some embodiments, the circuitry 202 of the server 102 may extract the vehicle information from the received electric charging information recorded for the period of time (such as a day, a week, and the like). The vehicle information may include, but not limited to, the registration number of the vehicle 112, an amount of electric charge transferred to the specific vehicle, like the vehicle 112, a postal address of an owner associated with the vehicle 112 or a contact number of the electronic apparatus 112A associated with the vehicle 112).

At 338, transmission operation of charging recommendation information may be performed. In an embodiment, the circuitry 202 of the server 102 may transmit the charging recommendation information to the electronic apparatus 112A associated with the vehicle 112. The contact details of the electronic apparatus 112A may be indicated by the received or extracted vehicle information (at 336). The charging recommendation information may be generated based on the vehicle information of the vehicle 112. The charging recommendation information may include, but not limited to, a charging guidance instruction (such as a suggestion of a nearby electric charging facility device which is close to the postal address of the owner of the vehicle 112 or close to geo-location of the vehicle 112), geo-locations of the plurality of electric charging facility devices, charging discount information (such as charging discount offers provided by a particular electric charging facility device). The charging guidance instruction may further include a suggestion of charging location based on a market value of electric charge in a geo-location, or a suggestion of charging time based on the market value of the electric charge. In some embodiments, the charging recommendation information may include fault information that may indicate a fault detected in the vehicle 112 during the charging. The fault may be, for example, no charge transferred to the vehicle 112, information about a faulty electrical port associated with the vehicle 112.

In accordance with an embodiment, the server 102 may be configured to receive current geo-location of the vehicle 112 or other vehicles indicated in the electric charging information. Based on the received current geo-location of the vehicle 112, the server 102 may transmit certain instructions or messages to the vehicle 112. For example, if the vehicle 112 reaches the nearby electric charging facility device (i.e. detected based on the geo-locations of the vehicle 112 and the nearby electric charging facility device), the server 102 may send a message to be rendered on a display associated with the electronic apparatus 112A, to initiate electric charge for the vehicle 112 with the nearby electric charging facility device. In other example, if the vehicle 112 is in particular geo-location where the market value of the electric charge is minimum, the server 102 send the message to be rendered on the display associated with the electronic apparatus 112A, to initiate electric charge for the vehicle 112 in such geo-location to save cost of the electric charge. Therefore, the disclosed server 102 may support the vehicles (such as the vehicle 112) for the electric charging to be received from the plurality of electric charging facility devices 104 registered with the server 102.

Figure 4:
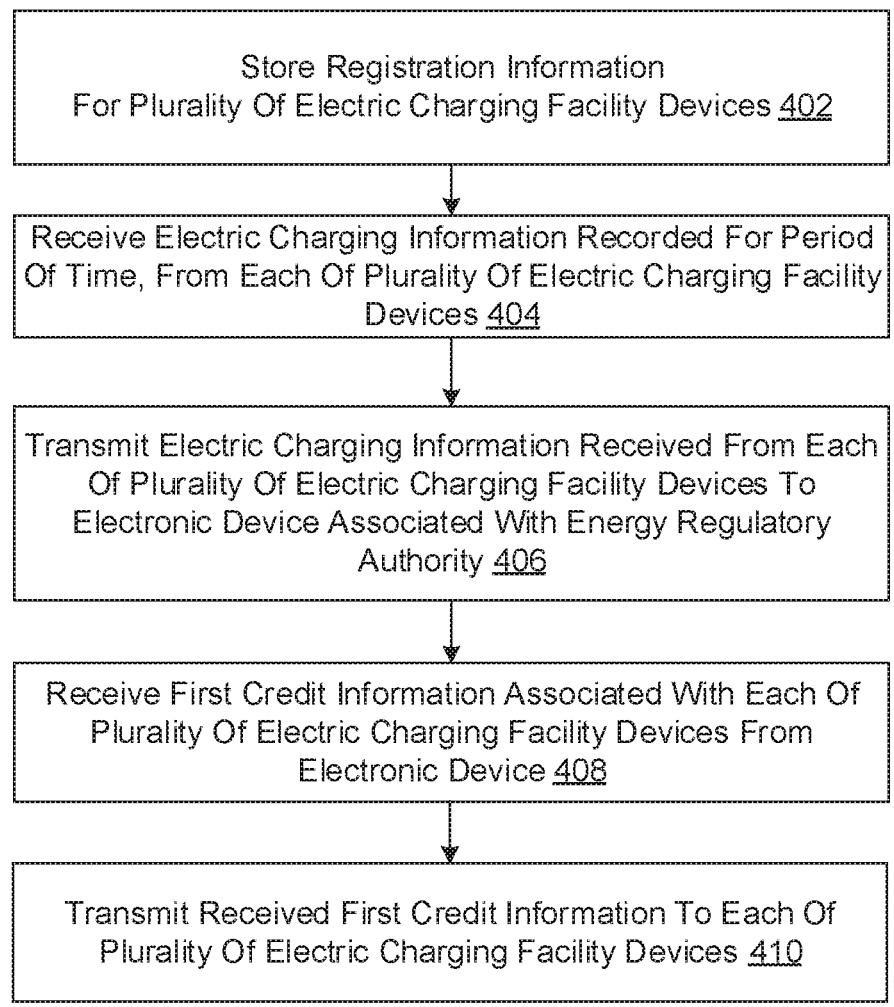
FIG. 4 is a flowchart that illustrates exemplary operations for management of credit, in accordance with an embodiment of the disclosure.

FIG. 4 is a flowchart that illustrates exemplary operations for management of credit, in accordance with an embodiment of the disclosure. With reference to FIG. 4, there is shown a flowchart 400. The flowchart 400 is described in conjunction with FIGS. 1, 2, and 3A-3C. The operations from 402 to 410 may be implemented, for example, by the server 102, or the circuitry 202 of FIG. 2. The operations of the flowchart 400 may start at 402.

At 402, the registration information for the plurality of electric charging facility devices 104 may be stored. In accordance with an embodiment, the server 102 or the circuitry 202 may be configured to store the registration information (such as a geo-location of each of the plurality of electric charging facility devices 104 identification information (i.e. unique identifier) associated with each of the plurality of electric charging facility devices 104, an electric charge cost to be taken from an occupant/owner of the vehicle 112, or any discount offer information (i.e. discount provided during selling of electric charge) associated with the plurality of electric charging facility devices 104 as described, for example, in FIG. 3A (such as at 302).

At 404, the electric charging information may be received from each of the plurality of electric charging facility devices 104. In accordance with an embodiment, the server 102 or the circuitry 202 may be configured to receive the electric charging information (such as the charging data, or the Renewable Energy Certificate) recorded for period of time (such as in certain days, in certain weeks, or in certain months), from each of plurality of electric charging facility devices 104, as described, for example, in FIG. 3A (such as at 310).

At 406, the electric charging information may be transmitted to the electronic device 106A associated with the energy regulatory authority 106. In accordance with an embodiment, the server 102 or the circuitry 202 may be configured to transmit the electric charging information received from each of plurality of electric charging facility devices 104 to the electronic device 106A associated with the energy regulatory authority 106, as described, for example, in FIG. 3A (such as at 314).

At 408, the first credit information may be received from the electronic device 106A. In accordance with an embodiment, the server 102 or the circuitry 202 may be configured to receive the first credit information, associated with each of plurality of electric charging facility devices 104, from the electronic device 106A of the energy regulatory authority 106, as described, for example, in FIG. 3A (such as at 316).

At 410, the received first credit information may be transmitted to each of the plurality of electric charging facility devices 104. In accordance to an embodiment, the server 102 or the circuitry 202 may be configured to transmit the received first credit information to each of plurality of electric charging facility devices 104, as described, for example, in FIG. 3A (such as at 318). Control may pass to end.

Various embodiments of the disclosure may provide a non-transitory, computer-readable medium and/or storage medium, and/or a non-transitory machine readable medium and/or storage medium stored thereon, a set of instructions executable by a machine and/or a computer (for example the server 102) for credit management. The set of instructions may be executable by the machine and/or the computer (for example the server 102) to perform operations that may include storage of registration information for a plurality of electric charging facility devices. The operations may further include reception of electric charging information recorded for a period of time, from each of the plurality of electric charging facility devices. The operations may further include transmission of the electric charging information received from each of the plurality of electric charging facility devices to an electronic device associated with an energy regulatory authority. The operations may further include reception of first credit information associated with each of the plurality of electric charging facility devices from the electronic device. The first credit information may be calculated based on the electric charging information. The operations may further include transmission of the received first credit information to each of the plurality of electric charging facility devices.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments that fall within the scope of the appended claims.

What is claimed is:

1. A server, comprising:
a memory which stores registration information for a plurality of electric charging facility devices; and
circuitry coupled to the memory, wherein the circuitry:
receives electric charging information recorded for a period of time, from each of the plurality of electric charging facility devices, wherein the plurality of electric charging facility devices includes a first electric charging facility device and a second electric charging facility device;
updates a number of the plurality of electric charging facility devices, registered with the server, based on the received electric charging information, wherein the update comprises at least one of:
addition of an additional electric charging facility device at a geographical location of the first electric charging facility device, wherein the addition of the additional electric charging facility device is based on the received electric charging information of the first electric charging facility device that indicates a maximum amount of transferred electric charge among the plurality of electric charging facility devices, or
removal of the second electric charging facility device based on the received electric charging information of the second electric charging facility device that indicates that an amount of transferred electric charge of the second electric charging facility device is less than a threshold;
transmits the electric charging information of the plurality of electric charging facility devices to an electronic device associated with an energy regulatory authority based on the updated number of the plurality of electric charging facility devices registered with the server;
receives first credit information associated with each of the plurality of electric charging facility devices from the electronic device, wherein the first credit information is calculated based on the electric charging information; and
transmits the received first credit information to each of the plurality of electric charging facility devices.

2. The server according to claim 1, wherein the electric charging information includes at least one of: a renewable energy certificate (REC), a first amount of electric charge provided over the period of time, vehicle information, date-time information, identification information associated with a corresponding electric charging facility device of the plurality of electric charging facility devices, or location information associated with the corresponding electric charging facility device.

3. The server according to claim 1, wherein each of the plurality of electric charging facility devices receives a renewable energy certificate (REC) from an electric grid device based on a purchase of a second amount of electric charge.

4. The server according to claim 1, wherein the circuitry further:
receives a request from a communication device associated with a carbon generation authority, wherein the communication device is different from the electronic device associated with the energy regulatory authority;
transmits the request received from the communication device to one of the plurality of electric charging facility devices;
receives second credit information, different from the first credit information, from the one of the plurality of electric charging facility devices based on the transmitted request; and
transmits the received second credit information to the communication device associated with the carbon generation authority.

5. The server accordingly to claim 4, wherein the circuitry further:
receives monetary information from the communication device, associated with the carbon generation authority, based on the transmitted second credit information; and
transmits the received monetary information to the one of the plurality of electric charging facility devices.

6. The server according to claim 5, wherein the circuitry further:
distributes the received monetary information among the plurality of electric charging facility devices, an electric grid device, the energy regulatory authority, and the server; and
transmits the distributed monetary information to the plurality of electric charging facility devices, the electronic device associated with the energy regulatory authority, and the electric grid device.

7. The server according to claim 1, wherein the first credit information associated with the first electric charging facility device is different from the first credit information associated with the second electric charging facility device.

8. The server according to claim 1, wherein the first credit information is calculated based on a geo-location for each of the plurality of electric charging facility devices.

9. The server according to claim 1, wherein the circuitry further:
extracts vehicle information from the received electric charging information recorded for the period of time, wherein extracted vehicle information indicates information associated with a vehicle; and
transmits charging recommendation information to an electronic apparatus associated with the vehicle.

10. The server according to claim 9, wherein
the charging recommendation information includes fault information associated with the vehicle, and
the fault information associated with the vehicle includes at least one of information related to a fault detected in the vehicle during an execution of a charging process or information related to a faulty electrical port associated with the vehicle.

11. The server according to claim 1, wherein the first credit information is associated with a low-carbon fuel standard (LCFS).

12. The server according to claim 1, wherein
the circuitry further controls the memory to update the registration information based on the updated number of the plurality of electric charging facility devices, and
the update of the registration information includes deregistration of information related to the second electric charging facility device in a case where the received electric charging information of the second electric charging facility device indicates that the amount of transferred electric charge of the second electric charging facility device is less than the threshold.

13. A method, comprising:
in a server:
storing, in a memory, registration information for a plurality of electric charging facility devices;
receiving electric charging information recorded for a period of time, from each of the plurality of electric charging facility devices, wherein the plurality of electric charging facility devices includes a first electric charging facility device and a second electric charging facility device;
updating a number of the plurality of electric charging facility devices, registered with the server, based on the received electric charging information, wherein the update comprises at least one of:
addition of an additional electric charging facility device at a geographical location of the first electric charging facility device, wherein the addition of the additional electric charging facility device is based on the received electric charging information of the first electric charging facility device that indicates a maximum amount of transferred electric charge among the plurality of electric charging facility devices, or
removal of the second electric charging facility device based on the received electric charging information of the second electric charging facility device that indicates that an amount of transferred electric charge of the second electric charging facility device is less than a threshold;
transmitting the electric charging information of the plurality of electric charging facility devices to an electronic device associated with an energy regulatory authority based on the updated number of the plurality of electric charging facility devices registered with the server;
receiving first credit information associated with each of the plurality of electric charging facility devices from the electronic device, wherein the first credit information is calculated based on the electric charging information; and
transmitting the received first credit information to each of the plurality of electric charging facility devices.

14. The method according to claim 13, wherein the electric charging information includes at least one of: a renewable energy certificate (REC), a first amount of electric charge provided over the period of time, vehicle information, date-time information, identification information associated with a corresponding electric charging facility device of the plurality of electric charging facility devices, or location information associated with the corresponding electric charging facility device.

15. The method according to claim 13, further comprising:
receiving a request from a communication device associated with a carbon generation authority, wherein the communication device is different from the electronic device associated with the energy regulatory authority;
transmitting the request received from the communication device to one of the plurality of electric charging facility devices;
receiving second credit information, different from the first credit information, from the one of the plurality of electric charging facility devices based on the transmitted request; and
transmitting the received second credit information to the communication device associated with the carbon generation authority.

16. The method according to claim 15, further comprising:
receiving monetary information from the communication device, associated with the carbon generation authority, based on the transmitted second credit information; and
transmitting the received monetary information to the one of the plurality of electric charging facility devices.

17. The method according to claim 16, further comprising:
distributing the received monetary information among the plurality of electric charging facility devices, an electric grid device, the energy regulatory authority, and the server; and
transmitting the distributed monetary information to the plurality of electric charging facility devices, the electronic device associated with the energy regulatory authority, and the electric grid device.

18. The method according to claim 13, further comprising:
extracting vehicle information from the received electric charging information recorded for the period of time, wherein extracted vehicle information indicates information associated with a vehicle; and
transmitting charging recommendation information to an electronic apparatus associated with the vehicle.

19. A system, comprising:
a plurality of electric charging facility devices; and
a server communicably coupled and registered with the plurality of electric charging facility devices, wherein the server:
receives electric charging information recorded for a period of time, from each of the plurality of electric charging facility devices, wherein the plurality of electric charging facility devices includes a first electric charging facility device and a second electric charging facility device;
updates a number of the plurality of electric charging facility devices, registered with the server, based on the received electric charging information, wherein the update comprises at least one of:
addition of an additional electric charging facility device at a geographical location of the first electric charging facility device, wherein the addition of the additional electric charging facility device is based on the received electric charging information of the first electric charging facility device that indicates a maximum amount of transferred electric charge among the plurality of electric charging facility devices, or
removal of the second electric charging facility device based on the received electric charging information of the second electric charging facility device that indicates that an amount of transferred electric charge of the second electric charging facility device is less than a threshold;

transmits the electric charging information of the plurality of electric charging facility devices to an electronic device associated with an energy regulatory authority based on the updated number of the plurality of electric charging facility devices registered with the server;

receives first credit information associated with each of the plurality of electric charging facility devices from the electronic device, wherein the first credit information is calculated based on the electric charging information; and transmits the received first credit information to each of the plurality of electric charging facility devices.

20. The server according to claim 1, wherein receives second credit information from each of the plurality of electric charging facility devices; and transmits monetary information corresponding to the second credit information to each of the plurality of electric charging facility devices based on a geo-location of a respective electric charging facility device of the plurality of electric charging facility devices, wherein the monetary information transmitted to the first electric charging facility device associated with a first geo-location is different from the monetary information transmitted to a third electric charging facility device associated with a second geo-location.

* * * * *